United States Patent
Spexarth (10) Patent No.: US 7,840,387 B1
(45) Date of Patent: Nov. 23, 2010

(54) SYSTEM AND METHOD OF DESIGNING A LOAD BEARING LAYER THAT INTERFACES TO A STRUCTURAL PASS-THROUGH OF AN INFLATABLE VESSEL

(75) Inventor: Gary R. Spexarth, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 745 days.

(21) Appl. No.: 11/778,858

(22) Filed: Jul. 17, 2007

(51) Int. Cl.
*G06F 17/50* (2006.01)
*G06F 17/00* (2006.01)
*B64G 1/00* (2006.01)
*B64G 1/22* (2006.01)

(52) U.S. Cl. ............... 703/1; 244/158.3; 244/159.4

(58) Field of Classification Search ............ 703/1
See application file for complete search history.

(56) References Cited

U.S. PATENT DOCUMENTS

| | | | |
|---|---|---|---|
| 5,455,777 | A | 10/1995 | Fujiyama et al. |
| 5,580,013 | A | 12/1996 | Velke |
| 6,231,010 | B1 | 5/2001 | Schneider et al. |
| 6,439,508 | B1 | 8/2002 | Taylor |
| 6,547,189 | B1 | 4/2003 | Raboin et al. |
| 6,785,616 | B2 | 8/2004 | Lung et al. |
| 6,899,301 | B2 | 5/2005 | Bigelow |
| 7,100,874 | B2 | 9/2006 | Bigelow et al. |
| 2004/0010382 | A1 | 1/2004 | Lung et al. |
| 2005/0061918 | A1 | 3/2005 | Bigelow |
| 2006/0042396 | A1 | 3/2006 | Qing et al. |
| 2006/0069521 | A1 | 3/2006 | Meyer |

OTHER PUBLICATIONS

Cavallaro et al. "Mechanics of plain-woven fabrics for inflated structures", 2003, Composit Structures No. 61, pp. 375-393.*
Odegard et al. "A continuum elastic-plastic model for woven-fabric/polymer-matrix composite materials under biaxial stress", 2001, Composites Science and Technology, No. 61, pp. 2501-2510.*
Yu et al. "Modelling and finite element treatment of intra-ply shearing of woven fabric", 2003, Journal of Materials Processing Technology, No. 138, pp. 47-52.*
Chretien, Nicolas. "Numerical Constitutive Models of Woven and Braided Textile Structural Composites", Apr. 16, 2002, 175 pages.*

* cited by examiner

*Primary Examiner*—Kamini S Shah
*Assistant Examiner*—Suzanne Lo
(74) *Attorney, Agent, or Firm*—Theodore U. Ro (57) ABSTRACT

A method for determining a design of an inflatable module including a rigid member disposed in a restraint layer, wherein the restraint layer includes orthogonal straps, includes modeling a strap adjacent to the rigid member and a strap connected to the rigid member. The adjacent strap and the member strap extend in a first direction. The method further includes selecting a first length of the member strap such that the adjacent strap carries load before the member strap during pressurization of the inflatable module, modeling tensions in the member strap with the first length and the adjacent strap during pressurization of the inflatable model, and outputting the modeled tensions in the member strap with the first length and the adjacent strap. An inflatable module includes a member strap having a length such that an adjacent strap carries load before the member strap during pressurization of the inflatable module.

29 Claims, 11 Drawing Sheets

FIG. 12

SYSTEM AND METHOD OF DESIGNING A LOAD BEARING LAYER THAT INTERFACES TO A STRUCTURAL PASS-THROUGH OF AN INFLATABLE VESSEL

ORIGIN OF THE INVENTION

The invention described herein was made by employee(s) of the United States Government and may be manufactured and used by or for the Government of the United States of America for governmental purposes without the payment of any royalties thereon or therefor.

BACKGROUND

1. Field

Embodiments of the present invention generally relate to inflatable modules.

2. Background Art

Inflatable modules are well known in the art, as disclosed in U.S. Pat. No. 6,547,189 (hereinafter "Raboin") assigned to the assignee of the present invention, which is hereby incorporated by reference in its entirety. Typically, an inflatable module is lightweight, collapsible, and compact prior to deployment, and is capable of being subsequently inflated to provide relatively large volume for storage, containment, human habitation, shelter, or work, as well as for space flight.

Figure 1:
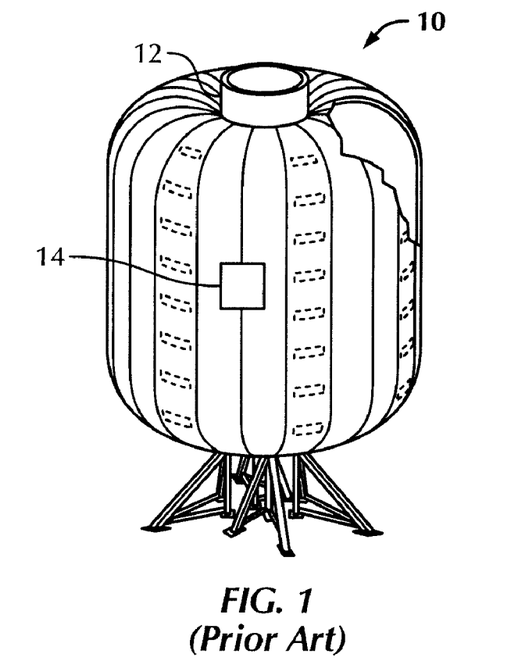
FIG. 1 shows a typical inflatable module.

FIG. 1 shows a typical inflatable module 10, which may withhold a relatively high pressure of an internal fluid, such as air or other gas or liquid, and may be made to any desired shape and size. The inflatable module 10 is shown in its inflated configuration and includes a rigid core 12 and an inflatable shell. The inflatable module 10 may also include a structural pass-through 14 (hereinafter "rigid member") disposed in the inflatable shell, such as a window, fluid port, hatch, connecting tunnel, etc. In the embodiment shown, the rigid member 14 is shown as a window.

Figure 2:
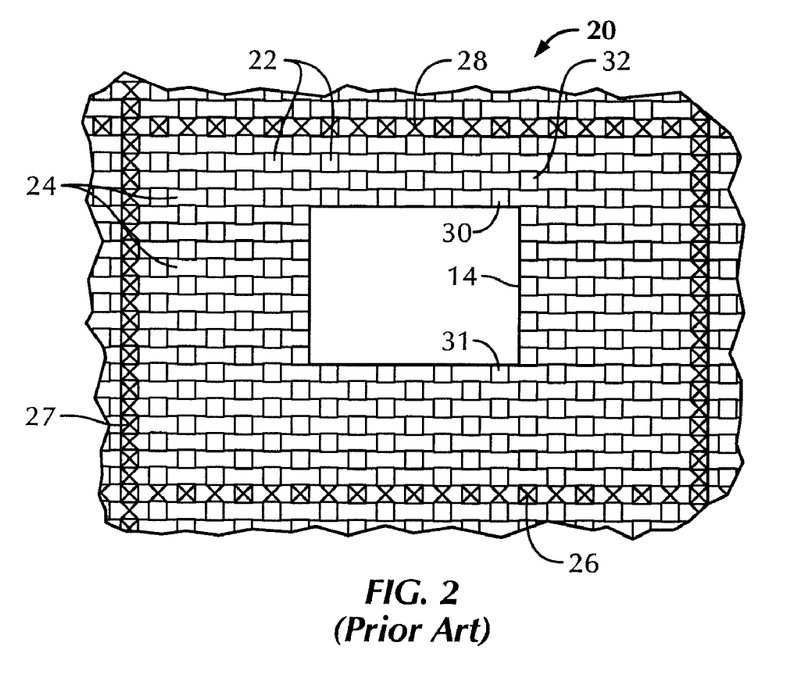
FIG. 2 shows a portion of the restraint layer of the inflatable module of FIG. 1.

The inflatable shell has two primary components: a restraint layer and a bladder. The restraint layer is the primary load bearing layer of the inflatable module 10 and reacts as a membrane to the entire pressure load. The restraint layer is typically fabricated from various high strength flexible materials. FIG. 2 shows a portion of the restraint layer 20 of the inflatable module 10. The restraint layer 20 is made up of high-strength fabric straps, which may be formed from a Kevlar, Vectran, or PBO narrow webbing material. More specifically, the restraint layer 20 has a woven webbing design, with both longitudinal straps 22 and hoop straps 24 orthogonal to the longitudinal straps 22. The longitudinal straps 22 and the hoop straps 24 are woven together.

Additionally, indexing stitches 26 secure the longitudinal straps 22 and hoop straps 24 together, and series of these indexing stitches form longitudinal stitch seams 27 and hoop stitch seams 28. Each indexing stitch 26 secures one hoop strap 24 to one longitudinal strap 22. Accordingly, the restraint layer 20 may be woven into a desired cylindrical, toroidal, or other inflatable module shape.

FIG. 2 also shows the rigid member 14 disposed in the restraint layer 20. Longitudinal straps 22 and hoop straps 24 intersecting the rigid member 14 are connected to a frame of the rigid member 14. The straps 22, 24 may be connected in any way known in the art. For example, connecting straps to a rigid member may include wrapping a strap around a smooth round slot or boss on the rigid member. The strap may then be woven or sewn back into the restraint layer. In one or more embodiments, a strap may be wrapped around the slot or boss and sewn back on itself to form a loop. Alternatively, the straps may be connected to the rigid member using a clevis and roller arrangement, as disclosed in Raboin.

Although including rigid members in inflatable modules is known in the art, incorporating a rigid member into an inflatable module without affecting the strength of the inflatable module is an extremely difficult engineering challenge. Because high-strength straps typically exhibit non-linear properties when stretched under load, the restraint layer of an inflatable module stretches non-linearly when an internal pressure is applied to the module (e.g., during pressurization). Furthermore, the rigid member typically exhibits a negligible amount of elongation when loaded as compared to the elongation of the restraint layer. Thus, it is difficult to analyze and predict the loads and elongation that occur in this non-linear system.

SUMMARY

In one aspect, embodiments of the invention relate to a method for determining a design of an inflatable module comprising a rigid member disposed in a restraint layer, wherein the restraint layer comprises orthogonal straps. The method includes modeling a strap adjacent to the rigid member and a strap connected to the rigid member, wherein the adjacent strap and the member strap extend in a first direction, selecting a first length of the member strap such that the adjacent strap carries load before the member strap during pressurization of the inflatable module, modeling tensions in the member strap with the first length and the adjacent strap during pressurization of the inflatable model, and outputting the modeled tensions in the member strap with the first length and the adjacent strap.

In one aspect, embodiments of the invention relate to an inflatable module, including a restraint layer comprising orthogonal straps and a rigid member disposed in and connected to the restraint layer. The straps include a member strap connected to the rigid member and extending in a first direction, and an adjacent strap adjacent to the rigid member and extending in the first direction. The member strap has a length such that the adjacent strap carries load before the member strap during pressurization of the inflatable module.

Other aspects of the invention will be apparent from the following description and the appended claims.

DETAILED DESCRIPTION

Specific embodiments of the present invention will now be described in detail with reference to the accompanying figures. Like elements in the various figures may be denoted by like reference numerals for consistency.

In the following detailed description of embodiments of the present invention, numerous specific details are set forth in order to provide a more thorough understanding of the invention. However, it will be apparent to one of ordinary skill in the art that the present invention may be practiced without these specific details. In other instances, well-known features have not been described in detail to avoid unnecessarily complicating the description.

Figure 3:
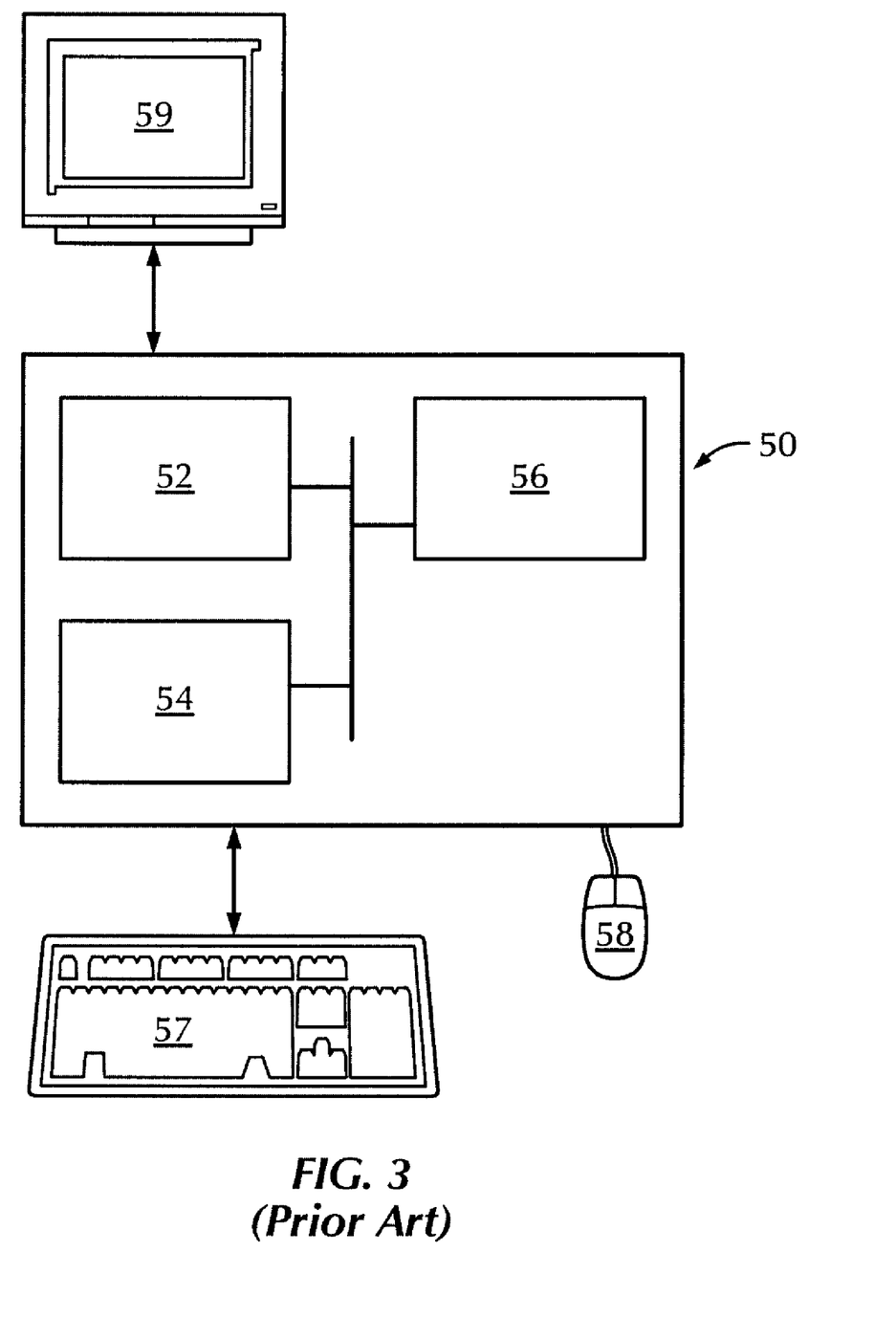
FIG. 3 shows a typical computer system.

In general, embodiments of the present invention relate to methods and apparatus for designing an inflatable module having one or more rigid members. One or more embodiments of the present invention may provide a repeatable process that can be used to design the restraint layer of an inflatable module. Methods of the present invention may be performed, at least in part, using a computer system, such as the computer system 50 shown in FIG. 3. The computer system 50 includes a processor 52, associated memory 54, a storage device 56, and numerous other elements and functionalities typical of modern computers (not shown). The computer 50 may also include input means, such as a keyboard 57 and a mouse 58, and output means, such as a monitor 59. Furthermore, one or more embodiments of the present invention may be implemented in software stored on, for example, the storage device 56 or a computer-readable medium.

Referring back to FIG. 2, it can be seen that a first longitudinal strap 30 is connected to a top part of the rigid member 14, and a second longitudinal strap 31 is connected to bottom part of the rigid member 14 directly below the first strap 30. Furthermore, a third longitudinal strap 32 runs adjacent to the rigid member 14. During pressurization of the inflatable module 10, all three straps 30, 31, 32 elongate under load created by the internal pressure. However, the elongation of the rigid member 14 is negligible compared to, or at least is substantially less than, the elongation of the straps 30, 31, 32. Thus, the first and second straps 30, 31 have a greater percent elongation (greater strain) than the third strap 32 to account for the lack of elongation of the rigid member 14. This results in a greater amount of tension in the first and second straps 30, 31 connected to the rigid member 14 than in the third strap 32 adjacent to the rigid member 14.

Furthermore, the first and second straps 30, 31 connected to the rigid member 14 may be connected by passing the straps 30, 31 through a slot in the rigid member 14 and sewing the straps 30, 31 back onto themselves to form a loop. Thus, the doubled-back straps 30, 31 may have an increased stiffness than that of other straps, e.g., the fold may result in a portion having twice the stiffness of an unfolded strap. Because of these factors, straps connected to a rigid member may load up to a higher tension than straps not connected to the rigid member. This situation may result in overloading of the straps and/or the rigid member.

Accordingly, one or more embodiments of the present invention take into account such differences in elongation such that the lengths of longitudinal and/or hoop straps may be determined to achieve a desired load profile in the restraint layer of an inflatable module. For example, in one or more embodiments, extra length may be added to the straps connected to the rigid member. Thus, during pressurization, straps adjacent to the rigid member carry load before the straps connected to the rigid member, which may ultimately result in a more desirable load profile. However, determining the amount of extra length to add, and, thus, the lengths of the straps needed to achieve a desired load profile, can be difficult. Accordingly, one or more embodiments of the present invention provide methods and apparatus to determine the lengths of longitudinal and/or hoop straps needed to achieve a desired load profile.

Figure 4:
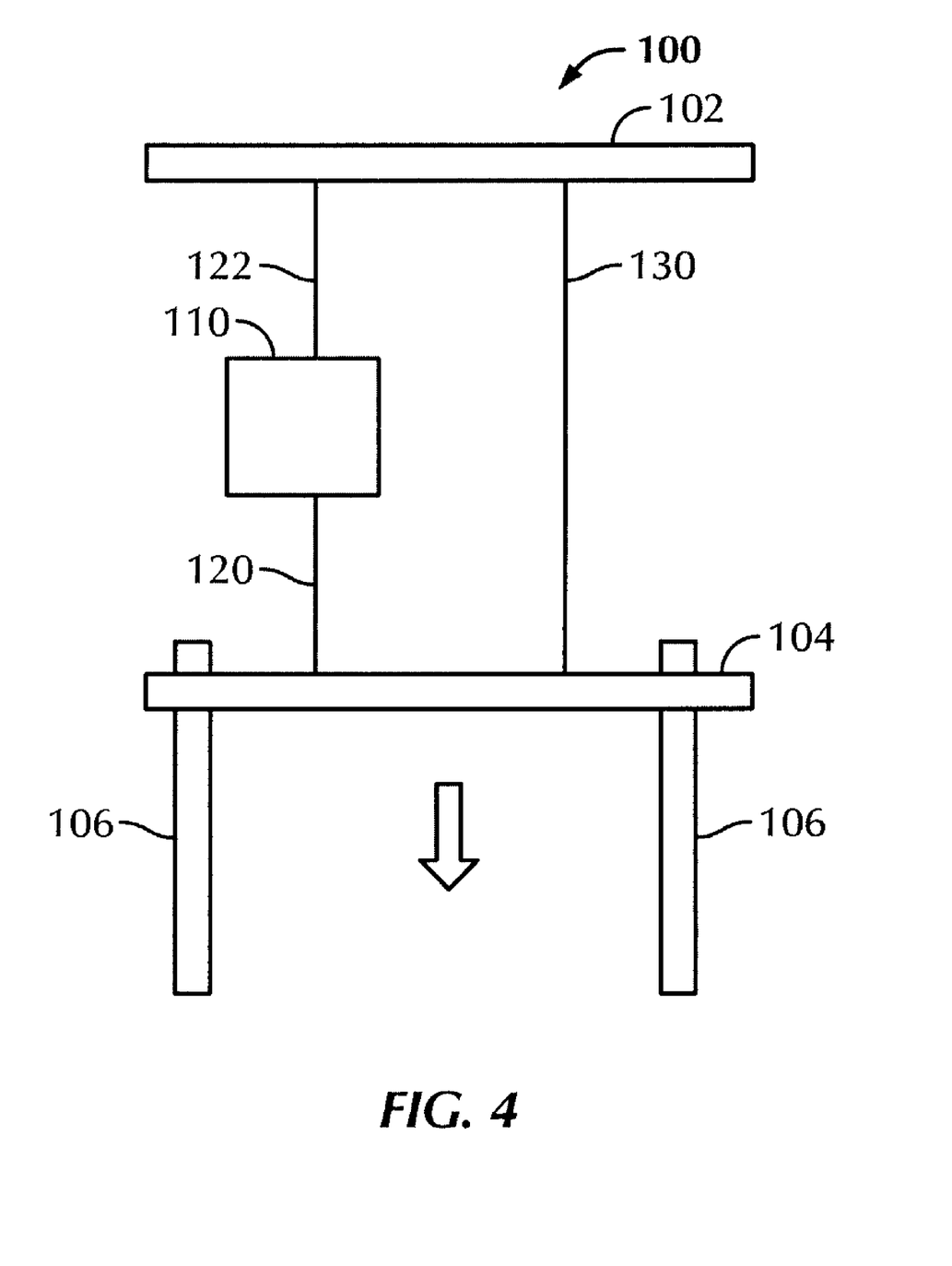
FIG. 4 shows a model of an inflatable module in accordance with one or more embodiments of the present invention.

FIG. 4 shows a representative model 100 of an inflatable module in accordance with one or more embodiments of the present invention. Models of inflatable modules may be used as a basis to determine the lengths of longitudinal and/or hoops straps needed to achieve a desired load profile. For example, models of inflatable modules may be used as a basis for software used to perform methods of the present invention. The model 100 is only one example of such models, and any representative model of an inflatable module may be used to determine the lengths of the straps to achieve a desired load profile. Furthermore, the model 100 is used to model longitudinal straps, not hoop straps. However, a similar model may be constructed to model hoop straps, or both longitudinal and hoop straps.

In the model 100, it can be estimated that the straps elongate during pressurization as if the straps are connected to an infinitely stiff beam that travels along two sliders, thereby simulating that the circumference and/or the height of the inflatable module increases uniformly throughout. Accordingly, the model 100 includes a horizontal static beam 102 and a horizontal slidable beam 104, each assumed to be infinitely stiff. The slidable beam 104 is mounted on sliders 106 and travels downward, as indicated by the arrow, during pressurization. Simulating that the circumference and/or the height of the inflatable module increases uniformly throughout may be modeled in any way known in the art.

A rigid member 110, such as a window, is centrally disposed between the beams 102, 104 and is assumed to have no elongation when loaded. A first member strap 120 is connected between the rigid member 110 and the slidable beam 104, and a second member strap 122 is connected between the rigid member 110 and the static beam 102. In the model 100, the first and second member straps 120, 122 are assumed to have identical lengths and properties. Additionally, an adjacent strap 130 is connected between the static beam 102 and the slidable beam 104 and adjacent to the rigid member 110. Furthermore, the member straps 120, 122 and the adjacent strap 130 run orthogonal to the beams 102, 104.

Numerous changes may be made to the model 100 to simulate the design of various inflatable modules. For example, more than one rigid member may be disposed between the beams 102, 104. In such an embodiment, a second rigid member may be disposed between the rigid member 110 and the static beam 102. Then, three member straps may be disposed between the beams 102, 104 and the rigid members. In other embodiments, the rigid member may not be centrally disposed, but rather disposed closer to one of the static beam 102 or the slidable beam 104. As such, the first and second member straps 120, 122 may have different lengths and/or properties.

Moreover, the straps 120, 122, 130 may be modeled as being composed of multiple sections. For example, the first member strap 120 may be modeled as having a first section that is of different strength than a second section, e.g., if a double backed loop to connect to the rigid member 110 is included in the first section, and the second section is a singular strap. However, in this embodiment, the straps 120, 122, 130 are assumed to be uniform.

Furthermore, in the model 100, the rigid member 110 is centrally disposed, and the first and second member straps 120, 122 have the same lengths and properties. Thus, in simulating the model 100, the member straps 120, 122 each elongate an amount equivalent to one half of the total elongation of the adjacent strap 130. However, if the lengths or properties of the first and second member straps 120, 122 differ, then such differences may be taken into account in determining the appropriate elongation. Additionally, because the first and second member straps 120, 122 are identical in the model 100, it may only be necessary to simulate and output results for one of the first and second member straps 120, 122. In other models, it may be necessary to simulate and output results for both member straps 120, 122.

The model 100 may be implemented in software, and settings of, or changes to, the model 100 may be achieved through user input or on the basis of a particular inflatable module design. Such settings may include the dimensions and properties of the inflatable module, rigid member 110, and straps 120, 122, 130. The settings may be used to run a simulation or to determine resultant strains and tensions in the straps due to pressure. In one or more embodiments of the present invention, the strains and tensions in longitudinal straps differ from those in hoop straps due to the geometry of the inflatable module. Thus, determining the resultant strains and tensions may also depend on the geometry of the inflatable module. Accordingly, the geometry of the inflatable module may also be a required setting.

Figure 5A:
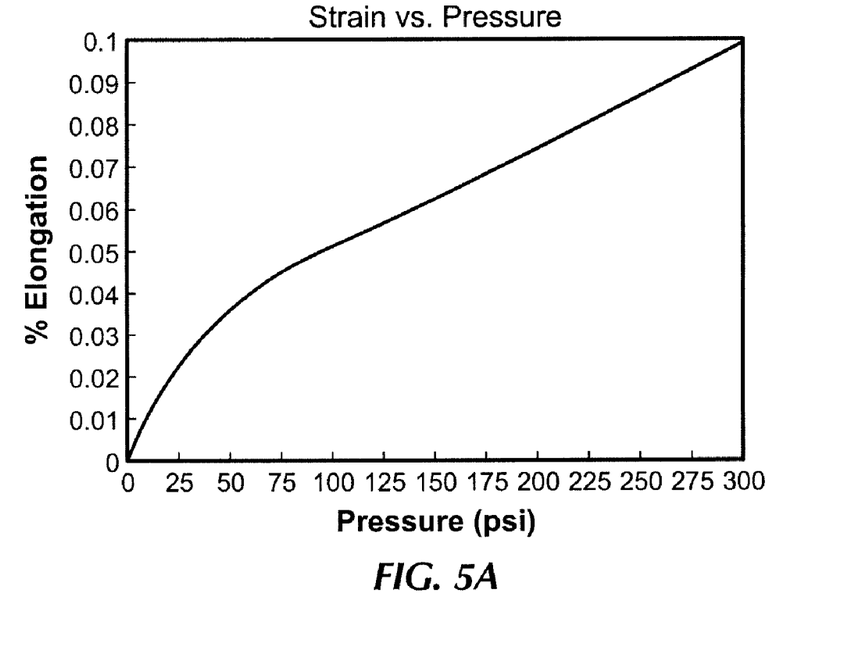
FIG. 5A shows a percent elongation vs. pressure curve for a strap in accordance with one or more embodiments of the present invention.
Figure 5B:
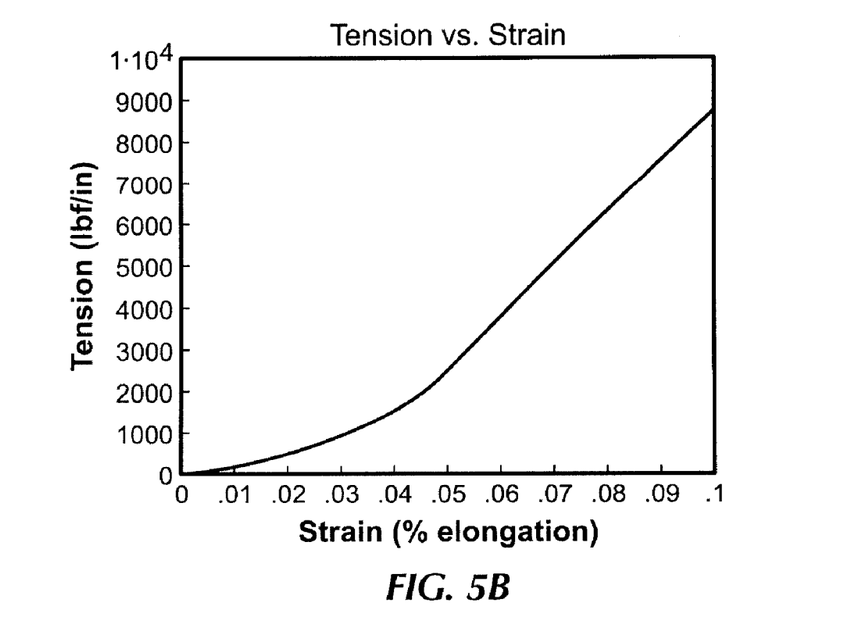
FIG. 5B shows a plot of longitudinal tension vs. strain in accordance with one or more embodiments of the present invention.

In one or more embodiments of the present invention, the properties of straps may be provided, for example, as stress-strain curves, tension vs. pressure data, etc. Alternatively, such data may be calculated. From this data, the strain and tension in a strap at a given pressure can be determined. For example, in accordance with one or more embodiments of the present invention, FIG. 5A shows a percent elongation vs. pressure curve for a strap and FIG. 5B shows a plot of longitudinal tension vs. strain. During pressurization, as the pressure increases, the strain, or elongation, in the strap also increases. The strain results in tension in the strap, and the tension may be determined from the tension vs. strain plot, for example.

Figure 6:
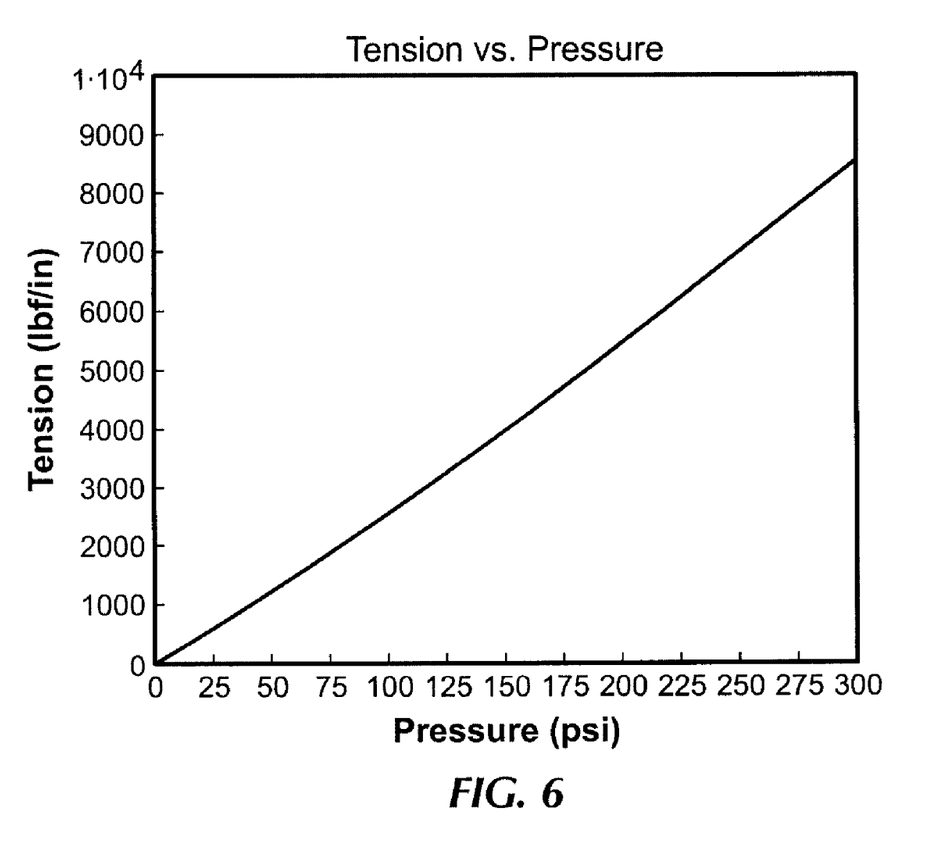
FIG. 6 shows a plot of nominal tension vs. pressure in accordance with one or more embodiments of the present invention.

The tension resulting from the strain in the strap in a module without a structural pass-through and at a user-defined pressure is the nominal tension. A plot of the nominal tension vs. pressure is shown in FIG. 6 in accordance with one or more embodiments of the present invention. In one or more embodiments of the present invention, the nominal tension may be used in models of inflatable modules to determine the overall tension in the straps, and the nominal tension may be determined in any way known in the art. For example, the nominal tension may be determined based on experimental data, determined from strain, or calculated as the average tension per strap in an inflatable module without a rigid member.

Figure 7:
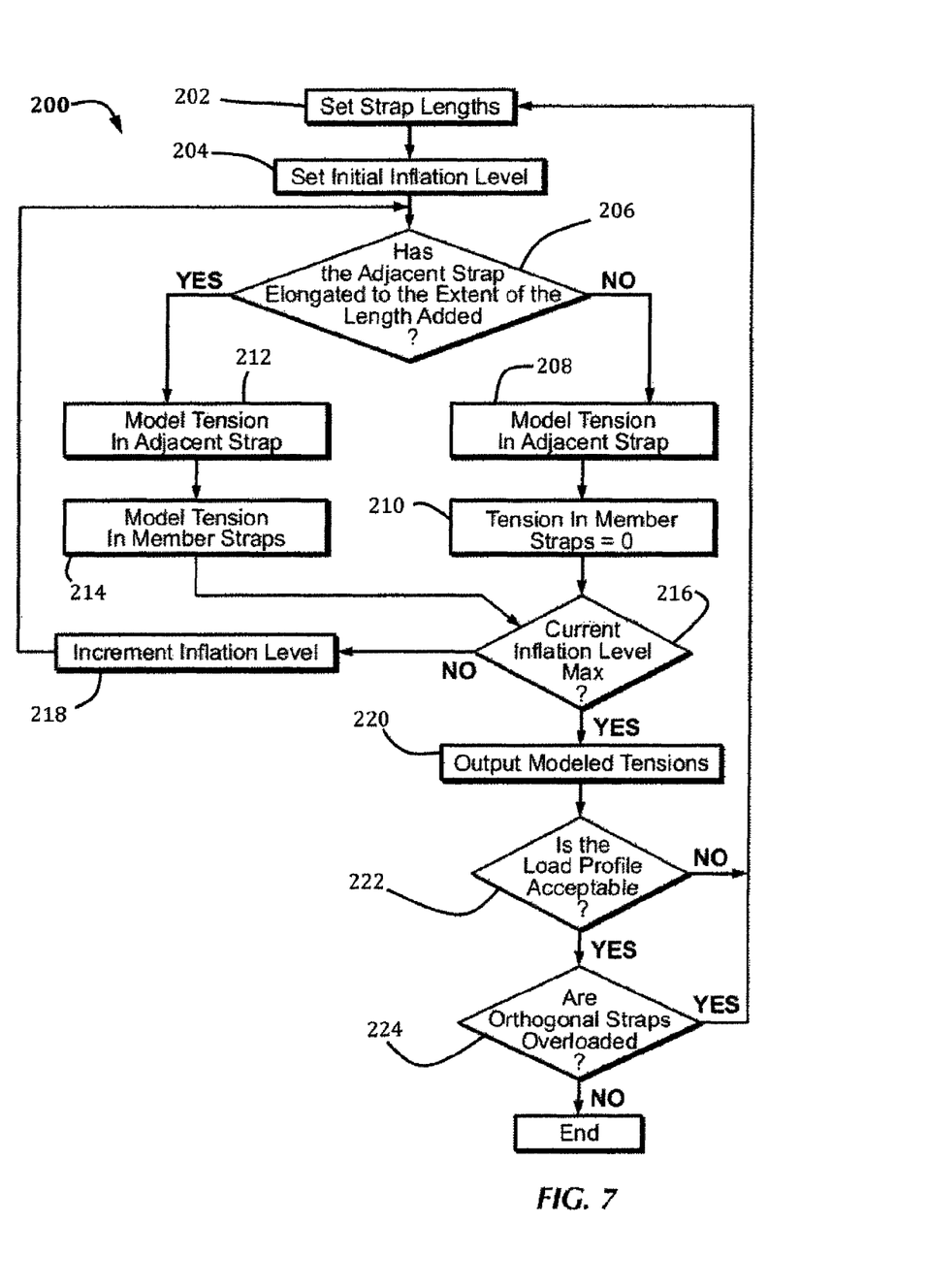
FIG. 7 shows a method for determining the lengths of straps of an inflatable module in accordance with one or more embodiments of the present invention.

FIG. 7 shows a method 200 for determining the lengths of the member straps 120, 122 and the adjacent strap 130 to achieve a desired load profile in accordance with one or more embodiments of the present invention. Because the first and second member straps 120, 122 of the model 100 have the same length, only the first member strap is modeled in the method 200. However, those skilled in the art will appreciate that a similar method may be used to determine the lengths of straps in any other model, and in such methods, it may be necessary to model all member straps. In one or more embodiments of the present invention, the method 200 is an iterative process in that strap lengths are simulated until strap lengths that achieve the desired load profile are found.

In accordance with the method 200, the lengths of the member straps 120, 122 and the adjacent strap 130 are set such that the adjacent strap 130 carries load before the member straps 120, 122 during pressurization of the inflatable module (step 202). The lengths of the straps 120, 122, 130 may be based on a design of the inflatable module, or they may be input by a user. For example, the lengths of the straps 120, 122, 130 may be preset according to the design of the inflatable module, and a user may input the extra length of the member straps 120, 122 such that the adjacent strap 130 carries load before the member straps 120, 122. According to the model 100, the extra length is equally added to each member strap 120, 122.

Next, an initial level of inflation of the inflatable module is set (step 204), and the method 200 models the tensions in the member straps 120, 122 and the adjacent strap 130 over a range of inflation levels. Because the member straps 120, 122 are similar, it is only necessary to model the tension in the first member strap 120. Furthermore, the level of inflation may be, for example, a pressure, and the initial level and range of inflation levels may be automatically generated or set by a user. In this embodiment, the method 200 begins at a pressure of zero psi, which relates to the internal pressure of the inflatable module during pressurization.

Because the member straps 120, 122 have extra length, the member straps 120, 122 are initially slack while the adjacent strap 130 is taut and elongates under the load due to pressurization. Thus, for each pressure level, it is determined whether the adjacent strap 130 has elongated to the extent of the total extra length added to the member straps 120, 122 (i.e., such that the member straps 120, 122 are taut and carry load) (step 206).

If the adjacent strap 130 has not elongated to the extent of the extra length, then the tension in the adjacent strap 130 is determined at the current pressure level (step 208). For example, the tension in the adjacent strap 130 may be determined to be the nominal tension in the adjacent strap 130 plus the additional tension in the adjacent strap 130 due to the member straps 120, 122 not carrying load. The additional load may be determined in any way known in the art, such as calculated by software, determined based on the nominal load of the adjacent strap 130, and/or based on a setting of the model 100 or user input. Furthermore, the tension in the first member strap 120 is determined to be zero because the first member strap 120 is slack (step 210).

If the adjacent strap 130 has elongated to the extent of the extra length added to the member straps 120, 122, then the member straps 120, 122 may begin to carry load. Thus, the tensions in the adjacent strap 130 (step 212) and the first member strap 120 (step 214) are determined. The tension in the adjacent strap 130 may be determined to be the nominal tension in the adjacent strap 130 plus the additional tension in the adjacent strap 130 just before the member straps 120, 122 began to carry load. That is, because the member straps 120, 122 now carry load, the additional load carried by the adjacent strap 130 will not increase, but instead will stay constant at the total amount of additional load at the point the member straps 120, 122 began carrying load. Furthermore, the tension in the first member strap 120 may be determined as the nominal tension in the first member strap 120 based on elongation of the first member strap 120.

Once the tensions in the first member strap 120 and the adjacent strap 130 have been determined, it is determined whether the current inflation level is the maximum inflation level as set by the range of inflation levels or end conditions (step 216). If the maximum inflation level has not yet been met, then the inflation level is increased by a set increment (step 218), and the method returns to step 206. Otherwise, if the maximum inflation level has been met, then the tensions in the first member strap 120 and the adjacent strap 130 have been determined over the desired range of inflation levels. The resulting tensions in the straps 120, 130, or the load profile, may then be output (step 220). For example, the tensions in the straps 120, 130 may be plotted or output as data.

Figure 8:
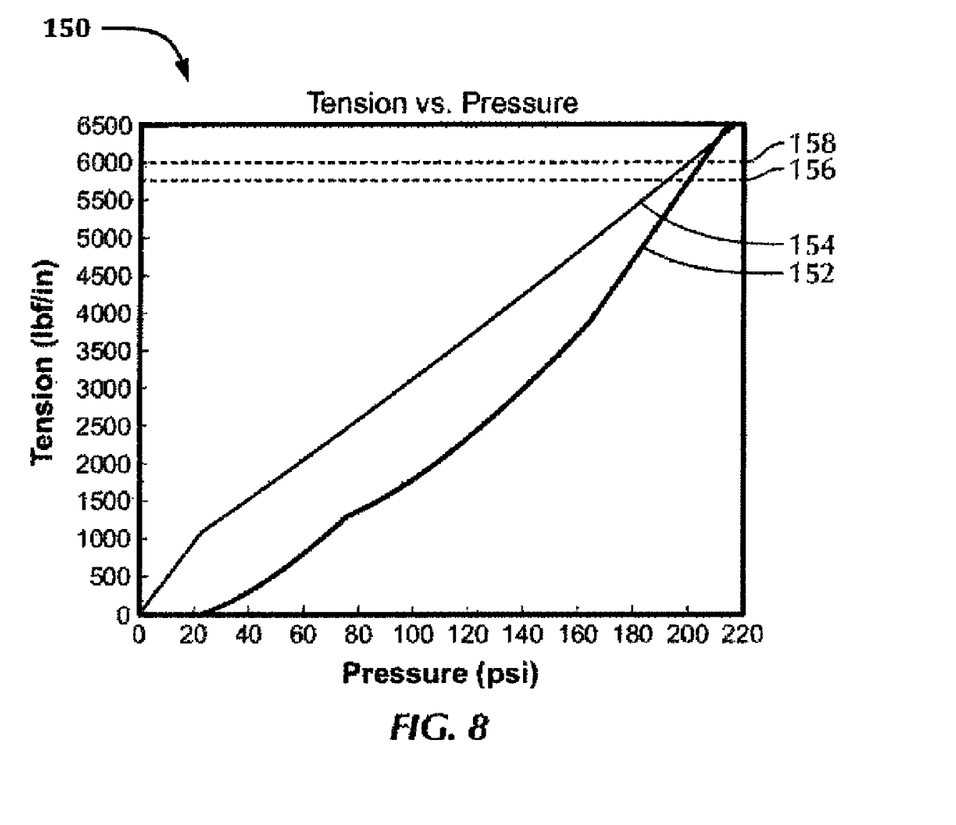
FIG. 8 shows an example of a tension vs. pressure plot in accordance with one or more embodiments of the present invention.

FIG. 8 shows an example of a tension vs. pressure plot 150 in accordance with one or more embodiments of the present invention. The plot 150 shows the tension in the first member strap 120 (indicated as 152) and the tension in the adjacent strap 130 (indicated as 154). Furthermore, the plot 150 shows the maximum tension before failure in the longitudinal straps 120, 130 (indicated by 158) and the maximum tension before failure of the rigid member 110 (indicated by 156). A plot similar to the plot 150 of FIG. 8 may be used to determine if the load profile is acceptable.

Accordingly, from the output of the method 200, it may be determined whether the load profile is acceptable or meets design standards or criteria (step 222). The determination of whether the load profile is acceptable may be performed by a user or may be automatically determined by software. If the load profile is not acceptable, then the method returns to step 202, where different values are selected for the lengths of the member straps 120, 122, and/or the adjacent strap 130. For example, based on the output load profile, a user or software may select another value for the extra length added to the member straps 120, 122.

If the load profile is acceptable, then it may be determined whether the member straps 120, 122 and the adjacent strap 130 overload straps orthogonal to the member straps 120, 122 and the adjacent strap 130 (step 224). That is, because of the different elongations of the member straps 120, 122 and the adjacent strap 130, the straps 120, 122, 130 have different relative motions during pressurization of the inflatable module. Furthermore, the orthogonal straps may be indexed to the member straps 120, 122, and the adjacent strap 130. Thus, different relative movements of the straps 120, 122, 130 may impart load and strain to the orthogonal straps.

Figure 9A:
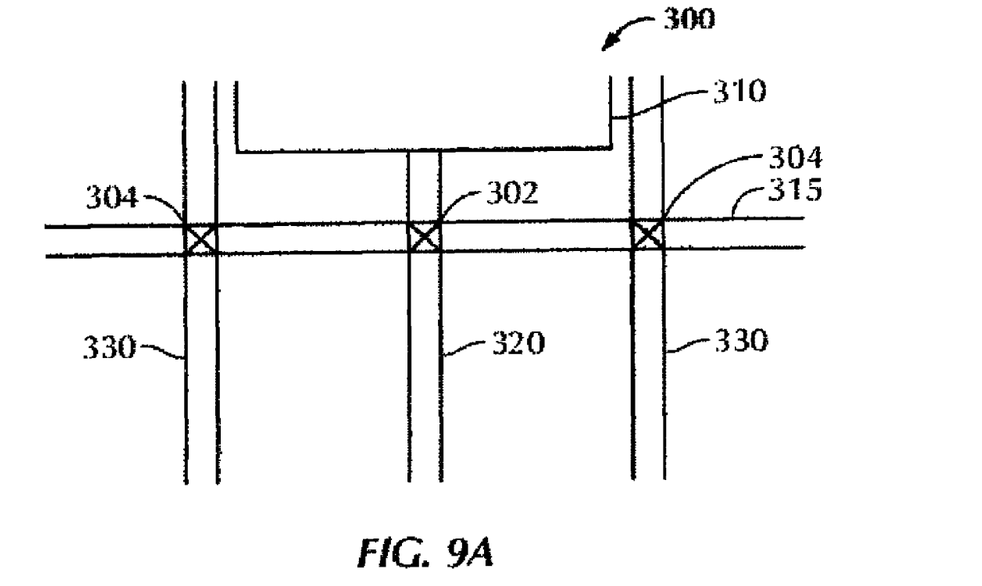
FIG. 9A shows an orthogonal strap model before pressurization in accordance with one or more embodiments of the present invention.

FIG. 9A shows an orthogonal strap model 300 before pressurization in accordance with one or more embodiments of the present invention. The orthogonal strap model 300 is similar to the model 100, and may be used with the model 100 and the method 200. The model 300 includes a rigid member 310, a first member strap 320 connected to the rigid member, and two adjacent straps 330 adjacent to the rigid member 310.

The first member strap 320 and the adjacent straps 330 extend longitudinally. Furthermore, the model 300 includes an orthogonal strap 315 orthogonal to the first member strap 320 and the adjacent straps 330. A first indexing stitch 302 secures the orthogonal strap 315 to the first member strap 320, and second indexing stitches 304 secure the orthogonal strap 315 to the adjacent straps 330. As shown in FIG. 9A, before pressurization, the first and second stitches 302, 304 are positioned along the same horizontal line.

Figure 9B:
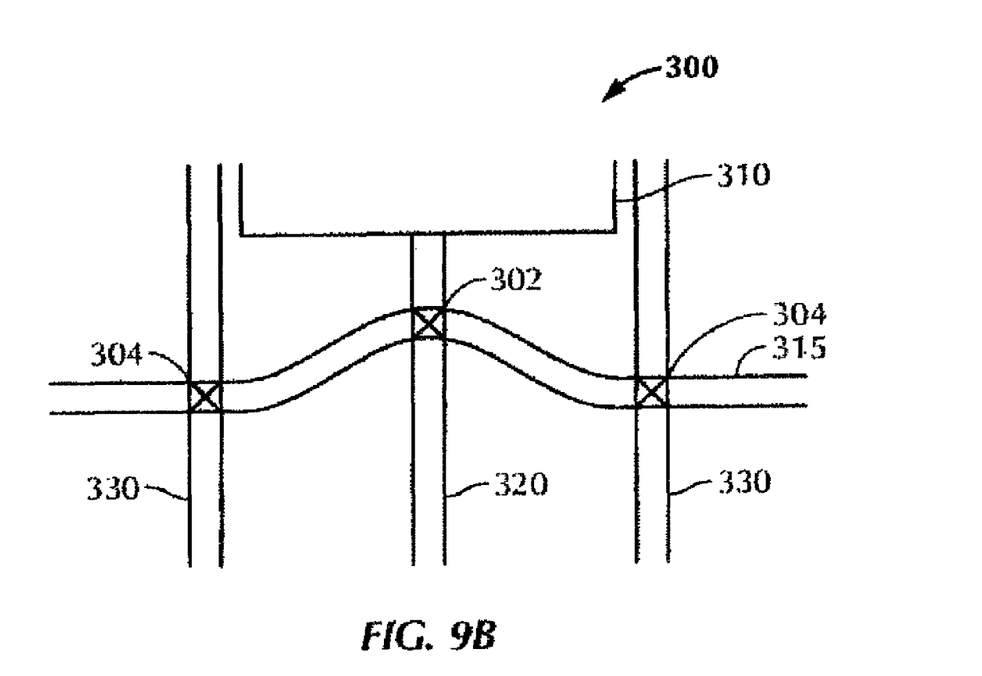
FIG. 9B shows the orthogonal strap model of FIG. 9A during pressurization.

FIG. 9B shows the orthogonal strap model 300 during pressurization in accordance with one or more embodiments of the present invention. During pressurization of the inflatable module, the first member strap 320 and the adjacent straps 330 elongate. However, because member strap 320 is stiffer, because the member strap 320 is shorter, doubled upon itself, and attached to the rigid member, the relative displacement of the adjacent 330 is greater than the member strap 320. This relative movement generates strain in the orthogonal strap 315, resulting in tension in the orthogonal strap 315. Those skilled in the art will appreciate that the relative movement does not occur until all of the slack of member strap 320 has been taken up.

Figure 9C:
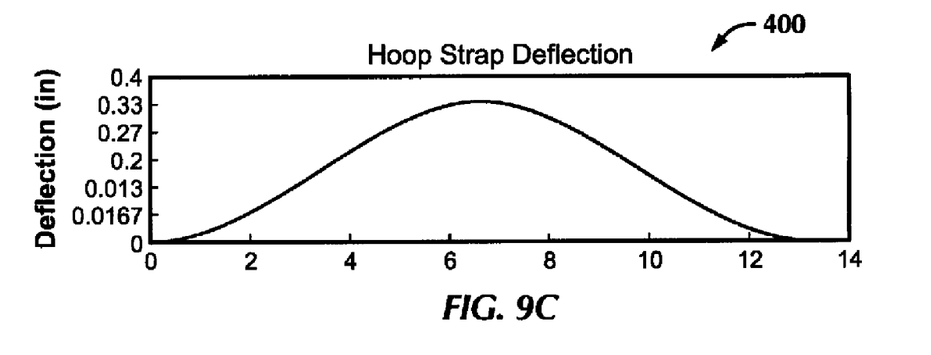
FIG. 9C shows a plot of orthogonal strap deflection in accordance with one or more embodiments of the present invention.

The tension in the orthogonal strap 315 may be determined in any way known in the art, and, further, may be based on determined elongations from the method 200. For example, in one or more embodiments of the present invention, a sine distribution of the relative motion of the first member strap 120 and the adjacent straps 130 may be assumed. FIG. 9C shows a plot 400 of the orthogonal strap 315 deflection in accordance with one or more embodiments of the present invention. The plot 400 shows the deflection of the orthogonal strap 315 along a horizontal length of the rigid member 110. The left side of the x-axis represents the intersection of the orthogonal strap 315 and the adjacent strap 130 to the left of the rigid member 110, and the right side represents the intersection of the orthogonal strap 315 and the adjacent strap 130 to the right of the rigid member 110. Thus, the deflection of the orthogonal strap 315 is assumed to be greater towards the center of the rigid member 110.

Furthermore, the strain in the orthogonal strap 315 may be determined using the plot 400 of the orthogonal strap 315 deflection. For example, the strain may be determined as the change in the length of the orthogonal strap 315 divided by the length of the orthogonal strap 315 along the horizontal length of the rigid member 110. Then, given properties of the orthogonal strap 315, the resulting tension may be determined.

Referring back to the method 200 of FIG. 7, the resulting tension in the orthogonal strap 315 may be determined and taken into account when determining the lengths of the member straps 120, 122 and the adjacent strap 130. If the orthogonal strap is overloaded, then the method 200 returns back to step 202. Then, different values for the member straps 120, 122 and/or the adjacent strap 130 are selected. Otherwise, if the orthogonal strap 315 is not overloaded, the lengths of the member straps 120, 122 and the adjacent strap 130 may be determined to be acceptable.

Accordingly, the lengths of the longitudinal straps of an inflatable module necessary to achieve a desired load profile may be determined from the model 100, the method 200, and the orthogonal strap model 300. Additionally, similar models and methods may be used to determine the lengths of the hoop straps of an inflatable module necessary to achieve a desired load profile. It is well within the ability of those skilled in the art to derive such models and methods for hoop straps from the models and methods presented herein.

Figure 10:
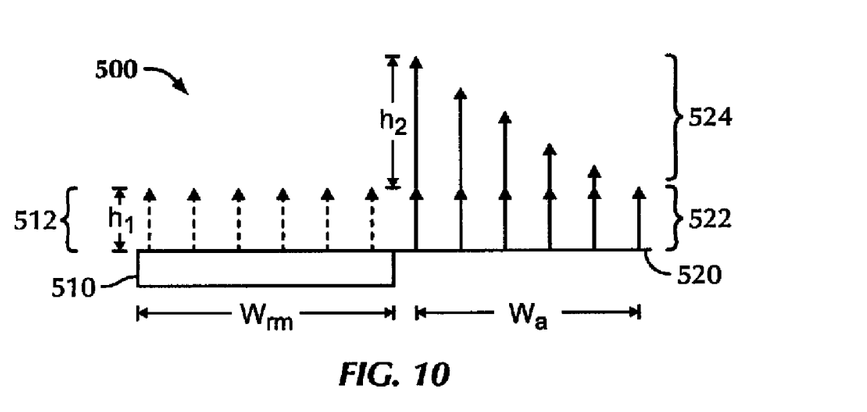
FIG. 10 shows a model of the load carried by a plurality of straps in accordance with one or more embodiments of the present invention.

In embodiments of the present invention, the additional load carried by an adjacent strap due to member straps not carrying load may be determined in any way known in the art. For example, FIG. 10 shows a model 500 of the load carried by a plurality of straps in accordance with one or more embodiments of the present invention. In the model 500, it is assumed that the plurality of straps of an inflatable module are disposed very close to one another. In accordance with the model 500, and for simplicity, the straps connected to a rigid member are modeled as a rigid member surface 510, and straps adjacent to the rigid member are modeled as an adjacent surface 520. Furthermore, the rigid member surface 510 has a width $w_{rm}$ equal to one half of the width of the modeled rigid member, and the adjacent surface 520 has a width $w_a$.

The load that the rigid member surface 510 would normally carry is shown as a rectangular area having a height $h_1$ indicated as 512. However, because member straps are initially slack, the rigid member surface 510 does not actually carry the load, and, thus, the load is shown using dashed lines. Furthermore, the nominal load of the adjacent surface 520 is shown as a rectangular area. The nominal load has the same height $h_1$ indicated as 522 because the two surfaces 510, 520 are assumed to have equal loads per unit of width.

The additional load on the adjacent surface 520 is shown as a triangular area with a height $h_2$ indicated as 524 distributed over the width $w_a$ of the adjacent surface 520. A triangular area is used in the model 500 because it is assumed straps nearer the rigid member would carry more of the additional load than straps farther from the rigid member. The additional load is equal to the load not carried by the rigid member surface 510, which may be expressed as $$w_{rm} \cdot h_1 = \frac{1}{2} w_a \cdot h_2. \tag{1}$$

Furthermore, it is assumed that the additional load on the adjacent surface 520 due to the rigid member surface 510 not carrying load is distributed over a width equal to the rigid member surface 510. Accordingly, $$w_{rm} = w_a \tag{2}$$

Then, the total load on the adjacent surface 520, nominal plus additional, may be expressed as $$w_a \cdot h_1 + w_{rm} \cdot h_1 = w_a \cdot h_1 + \frac{1}{2} w_a \cdot h_2. \tag{3}$$

Then, using the assumption that the widths are equal, Eq. 3 may be simplified to $$h_2 = 2h_1 \tag{4}$$

Thus, the height of the triangular area representing the additional load is twice the height of the rectangular surface representing the nominal load. According to the model 500, a strap immediately adjacent to a rigid member would carry an additional load equal to twice the nominal load the adjacent strap carries. In other words, the adjacent strap carries three times its nominal load.

The determination of the additional load in an adjacent strap based on its nominal load from model 500 may be used with, for example, the model 100 and the method 200 of determining the lengths of member straps and the adjacent strap to achieve a desired load profile. Furthermore, the model 500 is only one example of a model that may be used to determine the additional load of an adjacent strap. It is well within the ability of those skilled in the art to derive other models using other assumptions. For example, other models may be derived for inflatable modules having other spacings of straps or distributions of load.

Figure 11:
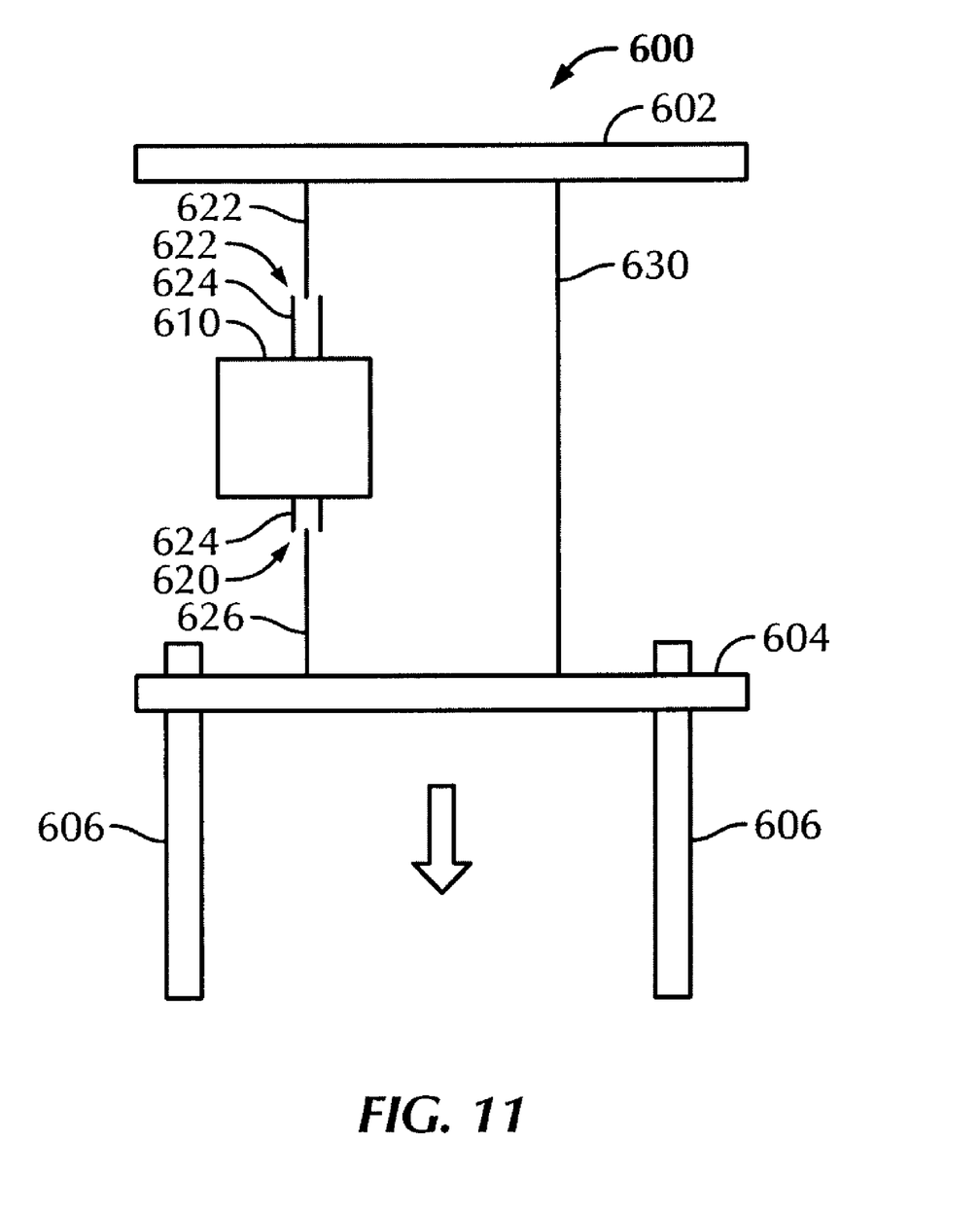
FIG. 11 shows another model of an inflatable module in accordance with one or more embodiments of the present invention.

FIG. 11 shows another model 600 of an inflatable module in accordance with one or more embodiments of the present invention. The model 600 is similar to the model 100 of FIG. 4. Specifically, the model 600 includes a horizontal static beam 602 and a horizontal slidable beam 604, each assumed to be infinitely stiff. The slidable beam 604 is mounted on sliders 606 and travels downward, as indicated by the arrow, during pressurization. This simulates that the circumference and/or the height of the inflatable module increases uniformly throughout.

Furthermore, the model 600 includes a window 610 (one type of rigid member), a first member strap 620, a second member strap 622, and an adjacent strap 630, all of which are disposed in a manner similar to the model 100. However, in the model 600, each of the member straps 620, 622 are composed of two parts: a double-backed part 624 and a single part 626. That is, each member strap 620, 622 is passed through a slot on the window 610, doubled-back, and sewn onto itself, thus creating a loop. Accordingly, each part 624, 626 must be taken into account in modeling the member straps 620, 622. Additionally, in the model 600, the additional load carried by the adjacent strap 630 is determined according to the model 500 of FIG. 10.

Figure 12:
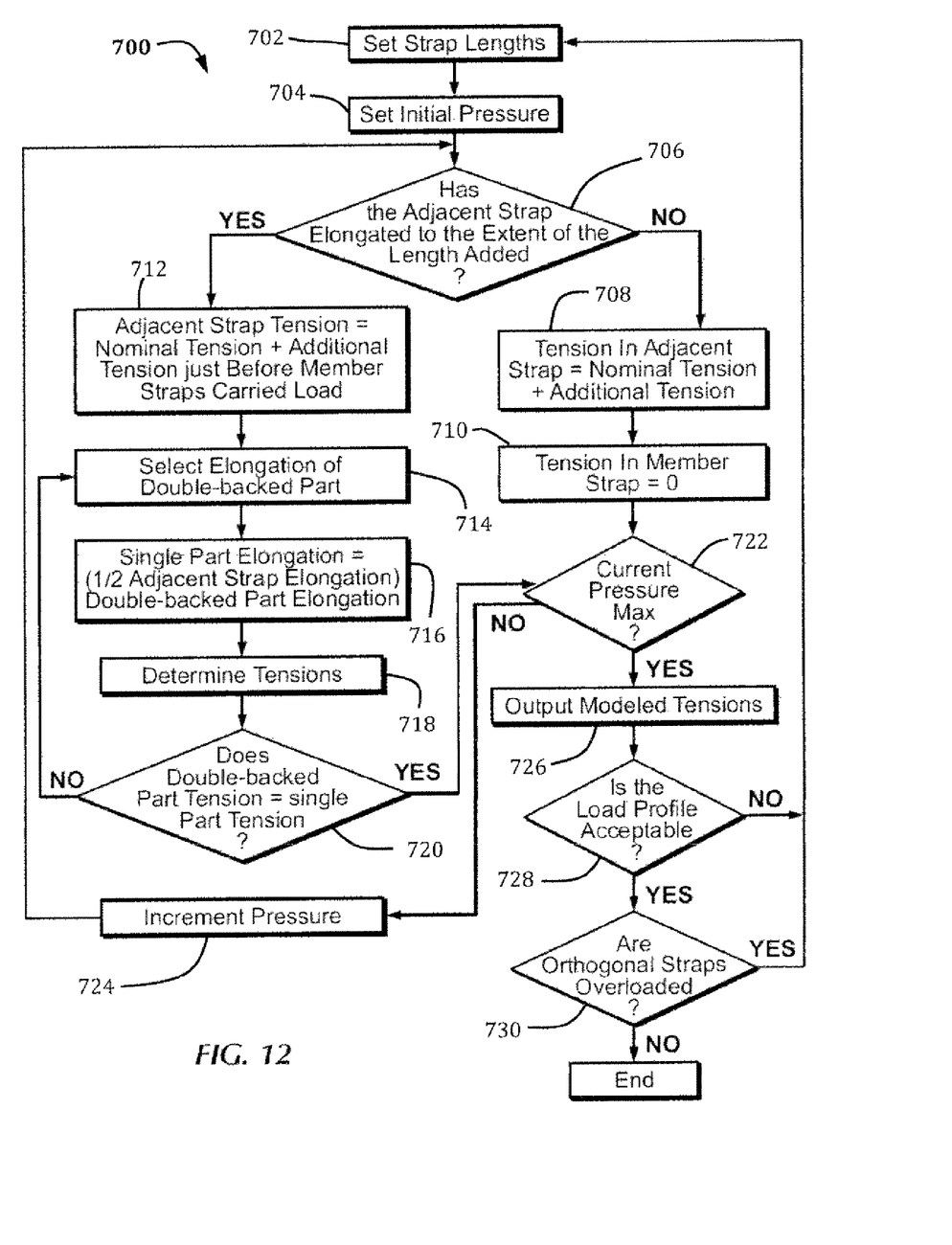
FIG. 12 shows another method for determining the lengths of straps of an inflatable module in accordance with one or more embodiments of the present invention.

FIG. 12 shows a method 700 for determining the lengths of the member straps 620, 622 and the adjacent strap 630 to achieve a desired load profile in accordance with one or more embodiments of the present invention. Before executing the method 700, a user may input any information the method 700 requires. For example, the user may input dimensions and properties of the window 610 and the straps 620, 622, 630, and the geometry of the inflatable module. Furthermore, the user may input start conditions and end conditions (e.g., start/stop pressure, pressure increments, and max tension). Additionally, the user may input the additional load on the adjacent strap 630 as a percent of the nominal load. In this case, and based on the model 500 of FIG. 10, the additional load is 200% of the nominal load.

In accordance with the method 700, the lengths of the member straps 620, 622 and the adjacent strap 630 are set such that the adjacent strap 630 carries load before the member straps 620, 622 during pressurization of the inflatable module (step 702). Furthermore, extra length added to the member straps 620, 622 is added to the double-backed part 624 of the member straps 620, 622. Next, the start pressure for inflation of the inflatable module is set (step 704), for example, at zero psi. Then, the tensions in the member straps 620, 622 and the adjacent strap 630 are modeled over the set range of pressures. Because the member straps 620, 622 are similar, it is only necessary to model the tension in one of the member straps 620, 622. In this embodiment, the tension in the first member strap 620 is determined.

For each pressure level it is determined whether the adjacent strap 630 has elongated to the extent of the total extra length added to the member straps 620, 622 (i.e., such that the member straps 620, 622 are taut and carry load) (step 706). In this embodiment, the elongation of the adjacent strap 630 at the current pressure level is determined from the stress-strain plot of FIG. 5A. This elongation is compared to the extra length added to the member straps 620, 622.

If the adjacent strap 630 has not elongated to the extent of the extra length, then the tension in the adjacent strap 630 is determined at the current pressure level (step 708). The tension in the adjacent strap 630 is determined to be the nominal tension in the adjacent strap 630 plus the additional tension in the adjacent strap 630 due to the member straps 620, 622 not carrying load. The nominal tension in the adjacent strap is determined from the tension vs. strain plot of FIG. 5B based on the elongation determined from the stress-strain plot of FIG. 5A. Then, the additional tension is determined to be twice the nominal tension. Additionally, the tension in the first member strap 620 is determined to be zero because the first member strap 620 is slack (step 710).

If the adjacent strap 630 has elongated to the extent of the extra length added to the member straps 620, 622, then the member straps 620, 622 begin to carry load. Thus, the tensions in the adjacent strap 630 and the first member strap 620 are determined. The tension in the adjacent strap 630 is determined in the manner discussed above as the nominal tension in the adjacent strap 630 plus the additional tension in the adjacent strap 630 just before the member straps 620, 622 began to carry load (step 712).

The tension in the first member strap 620 is determined as the nominal tension in the first member strap 620 based on elongation of the first member strap 620. However, the double-backed part 624 and the single part 626 of the first member strap 620 carry the same load, and, thus, have the same tension, but elongate at different rates. Accordingly, the elongation of each part 624, 626 must be determined to determine the tension in the first member strap 620.

In one or more embodiments, the tension in the first member strap 620 may be determined through an iterative process. For example, a value for the elongation of the double-backed part 624 is selected (step 714). Then, the elongation of the single part 626 is determined to be half of the elongation of the adjacent strap 630 less the selected elongation of the double-backed part 624 (step 716). Based on the elongations of the two parts 624, 626, the tension in each part may be determined (step 718). Finally, if the tension in each of the two parts 624, 626 is equal (step 720), the selected elongation of the first part 624 is correct. Thus, the tension has been determined. Otherwise, another value for the elongation of the double-backed part 624 is selected, and the process repeats.

Once the tensions in the first member strap 620 and the adjacent strap 630 have been determined, it is determined whether the current pressure is the maximum pressure (step 722). If the maximum pressure has not yet been met, then the pressure is increased by a set increment (step 724), and the method 700 returns to step 706. Otherwise, if the maximum pressure has been met, then the tension in the first member strap 620 and the adjacent strap 630 has been determined over the desired range of pressures. The resulting tension in the straps 620, 630, or the load profile, may then be output (step 726). For example, the tension in the straps 620, 630 may be plotted or output as data, as shown in FIG. 8.

Accordingly, from the output of the method 700, it may be determined whether the load profile is acceptable or meets design standards or criteria (step 728). If the load profile is not acceptable, then the method returns to step 702, where different values are selected for the lengths of the member straps 620, 622, and/or the adjacent strap 630. If the load profile is acceptable, then it may be determined whether the member straps 620, 622 and the adjacent strap 630 overload orthogonal straps in the manner discussed with reference to FIGS. 9A-9C (step 730).

Furthermore, the resulting tension in orthogonal straps may be determined and taken into account when determining the lengths of the member straps 620, 622 and the adjacent strap 630. If the orthogonal strap 315 is overloaded, then the method 700 returns back to step 702. Then, different values for the member straps 620, 622 and/or the adjacent strap 630 are selected. Otherwise, if the orthogonal strap 315 is not overloaded, the lengths of the member straps 620, 622 and the adjacent strap 630 may be determined to be acceptable.

Accordingly, the lengths of the longitudinal straps of an inflatable module necessary to achieve a desired load profile may be determined from the model 600 and the method 700. Additionally, similar models and methods may be used to determine the lengths of the hoop straps of an inflatable module necessary to achieve a desired load profile. It is well within the ability of those skilled in the art to derive such models and methods for hoop straps from the models and methods presented herein.

In accordance with embodiments of the present invention, an inflatable module having one or more rigid members, such as the inflatable module of FIG. 1, may be designed to achieve a desired load profile. Thus, the inflatable module may be designed to carry loads due to pressurization of the inflatable module, as well as any other loads on the inflatable module. More specifically, referring back to FIG. 2, the lengths of the straps of the inflatable module, whether connected to the rigid member or not, may be determined to achieve a desired load profile.

Embodiments of the present invention may provide one or more of the following advantages. Inflatable modules having one or more rigid members may be designed to withstand the loads of pressurization, as well as other loads. Furthermore, the lengths of straps of an inflatable module may be determined to achieve a desired profile. One or more embodiments of the present invention provide repeatable processes by which the lengths of straps of an inflatable module may be determined. Even further, inflatable modules having one or more rigid members may be analyzed based on the length of straps of the inflatable modules. Additionally, inflatable modules may be constructed based on a determined design.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a design of an inflatable module comprising a rigid member disposed in a restraint layer, wherein the restraint layer comprises orthogonal straps, the method comprising:
    modeling an adjacent strap, a member strap, and the rigid member in accordance with pressurization of the inflatable module to achieve a predetermined load profile, wherein the adjacent strap is comprised of a first strap adjacent to the rigid member but not connected to the rigid member and the member strap is comprised of a second strap connected to the rigid member, wherein the adjacent strap and the member strap are modeled to extend in a first direction;
    selecting a first length of the member strap such that, in accordance to the predetermined load profile, the adjacent strap is modeled to carry load before the member strap during pressurization of the inflatable module;
    modeling tensions in the member strap with the first length and the adjacent strap during pressurization of the inflatable model at predetermined pressure level increments over a predetermined pressure range; and outputting the modeled tensions in the member strap with the first length and the adjacent strap at a predetermined maximum pressure level, wherein the step of modeling the adjacent strap, the member strap, and the rigid member comprises modeling an elongation of the adjacent strap and the member strap in accordance with pressurization of the inflatable module at the predetermined pressure level increments, and wherein the rigid member exhibits substantially no elongation when loaded.

2. The method of claim 1, further comprising determining whether the modeled tensions in the member strap and the adjacent strap are acceptable in accordance with the predetermined load profile.

3. The method of claim 2, further comprising:
if the modeled tensions are not acceptable in accordance with the predetermined load profile, substituting the first length of the member strap with a second length of the member strap such that the adjacent strap is modeled to carry load before the member strap during pressurization of the inflatable module;
modeling tensions in the member strap with the second length and the adjacent strap during pressurization of the inflatable model at the predetermined pressure level increments over the predetermined pressure range; and
outputting the modeled tensions in the member strap with the second length and the adjacent strap at the predetermined maximum pressure level.

4. The method of claim 1, wherein the step of modeling tensions in the member strap with the first length and the adjacent strap comprises determining whether the adjacent strap has elongated to the extent that the member strap also carries load.

5. The method of claim 4, wherein if the adjacent strap has not elongated to the extent that the member strap also carries load, then the step of modeling tensions in the member strap with the first length and the adjacent strap further comprises modeling the tension in the member strap as zero, and modeling the tension in the adjacent strap as a nominal tension plus an additional tension for the entire predetermined pressure range.

6. The method of claim 5, wherein the nominal tension is modeled based on the elongation of the adjacent strap.

7. The method of claim 5, wherein the additional tension is modeled based on the nominal tension.

8. The method of claim 7, wherein the additional tension is set as twice the nominal tension.

9. The method of claim 4, wherein if the adjacent strap has elongated to the extent that the member strap also carries load, then the step of modeling tensions in the member strap with the first length and the adjacent strap further comprises modeling the tension in the adjacent strap as a nominal tension plus an additional tension for the entire predetermined pressure range.

10. The method of claim 9, wherein the nominal tension is modeled based on the elongation of the adjacent strap.

11. The method of claim 9, wherein the additional tension is set as a constant equal to the value of the additional tension at the highest pressure level increment in which the tension in the member strap is zero.

12. The method of claim 10, wherein the additional tension is a predetermined constant value for subsequent pressure level increments after the member strap carries load.

13. The method of claim 9, wherein the tension in the member strap is modeled based on the elongation of the member strap.

14. The method of claim 13, wherein the member strap with the first length comprises a first section and a second section, and wherein the step of modeling tensions in the member strap with the first length and the adjacent strap comprises:
selecting a first value of elongation for the first section;
determining a second value of elongation for the second section based on the selected first value of elongation and the elongation of the adjacent strap; and
determining the tensions in the first section and the second section.

15. The method of claim 14, wherein the step of modeling tensions in the member strap with the first length and the adjacent strap further comprises selecting a third value of elongation for the first section and replacing the third value of elongation for the first value of elongation if the tension in the first section does not equal the tension in the second section.

16. The method of claim 14, wherein one of the first section and the second section is doubled-backed forming a loop to connect to the rigid member, and the other of the first section and the second section is not double-backed thereby remaining a singular strap.

17. The method of claim 1, wherein the step of modeling the adjacent strap, the member strap, and the rigid member comprises providing predetermined properties of the adjacent strap and the member strap.

18. The method of claim 1, further comprising:
modeling a second adjacent strap and a second member strap in accordance with pressurization of the inflatable module to achieve the predetermined load profile, wherein the second adjacent strap is comprised of a third strap adjacent to the rigid member but not connected to the rigid member and the second member strap is comprised of a fourth strap connected to the rigid member, wherein the second adjacent strap and the second member strap are modeled to extend in a second direction;
selecting a third length of the second member strap such that the second adjacent strap is modeled to carry load before the second member strap during pressurization of the inflatable module;
modeling tensions in the second member strap and the second adjacent strap during pressurization of the inflatable model at the predetermined pressure level increments over the predetermined pressure range; and
outputting the modeled tensions in the second member strap and the second adjacent strap at the predetermined maximum pressure.

19. The method of claim 18, wherein the second direction is orthogonal to the first direction.

20. The method of claim 18, further comprising determining whether the modeled tensions in the second member strap and the second adjacent strap are acceptable in accordance with the predetermined load profile.

21. The method of claim 2, further comprising:
modeling an orthogonal strap in accordance with pressurization of the inflatable module to achieve the predetermined load profile, wherein the orthogonal strap is modeled to extend in a third direction orthogonal to the first direction; and
modeling tension in the orthogonal strap at the predetermined pressure level increments over the predetermined pressure range.

22. The method of claim 21, wherein the orthogonal strap is attached to the member strap and the adjacent strap, wherein relative movement between the member strap and the adjacent strap causes displacement in the orthogonal strap, and wherein the step of modeling the tension in the orthogonal strap comprises modeling the tension in the orthogonal strap due to the displacement of the orthogonal strap.

23. The method of claim 1, further comprising determining whether the modeled tension in the orthogonal strap is acceptable in accordance with the predetermined load profile.

24. The method of claim 2, further comprising providing the design of the inflatable module.

25. The method of claim 2, further comprising providing the inflatable module based on the design of the inflatable module.

26. The method of claim 1, wherein the rigid member is selected from a group consisting of a window, a hatch, a fluid port, and a connecting tunnel.

27. An inflatable module, comprising:
   a restraint layer comprising orthogonal straps; and
   a rigid member disposed in and connected to the restraint layer,
wherein the straps include a member strap connected to the rigid member extending in a first direction, and an adjacent strap not connected to the rigid member and adjacent to the rigid member extending in the first direction,
wherein the rigid member exhibits substantially no elongation when loaded, and
   wherein the member strap has a length such that the adjacent strap carries load before the member strap during pressurization of the inflatable module.

28. The inflatable module of claim 27, wherein the length of the member strap is determined by:
   modeling the adjacent strap and the member strap;
   selecting a first length of the member strap such that the adjacent strap carries load before the member strap during pressurization of the inflatable module;
   modeling tensions in the member strap with the first length and the adjacent strap during pressurization of the inflatable model; and
   outputting the modeled tensions in the member strap with the first length and the adjacent strap.

29. The inflatable module of claim 27, wherein the orthogonal straps are interwoven.

* * * * *